US012634206B2

(12) United States Patent (10) Patent No.: US 12,634,206 B2
Saxena et al. (45) Date of Patent: May 19, 2026

(54) GAN-DRIVEN NETWORK TRAFFIC SAMPLING STRATEGY

(71) Applicant: International Business Machines Corporation, Armonk, NY (US)

(72) Inventors: Rajesh Kumar Saxena, Thane West (IN); Harish Bharti, Pune (IN); Sandeep Sukhija, Sri Ganganagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 344 days.

(21) Appl. No.: 18/529,076

(22) Filed: Dec. 5, 2023

(65) Prior Publication Data

US 2025/0184232 A1 Jun. 5, 2025

(51) Int. Cl.
| | |
|---|---|
| *G06F 15/173* | (2006.01) |
| *H04L 41/06* | (2022.01) |
| *H04L 41/16* | (2022.01) |
| *H04L 43/022* | (2022.01) |

(52) U.S. Cl.
CPC .............. *H04L 41/16* (2013.01); *H04L 41/06* (2013.01); *H04L 43/022* (2013.01)

(58) Field of Classification Search
CPC ........ H04L 41/16; H04L 41/06; H04L 43/022
USPC ....................................................... 709/224
See application file for complete search history.

(56) References Cited

U.S. PATENT DOCUMENTS

| | | | | |
|---|---|---|---|---|
| 10,476,893 | B2 * | 11/2019 | Baradaran ........... | H04L 63/1441 |
| 10,834,114 | B2 * | 11/2020 | Karasaridis ............ | H04L 63/10 |
| 10,951,498 | B2 | 3/2021 | Alcala et al. | |
| 11,297,084 | B2 * | 4/2022 | Huang ................... | G06N 3/045 |
| 11,410,048 | B2 * | 8/2022 | Misu ..................... | G06N 3/0464 |
| 11,470,101 | B2 * | 10/2022 | Koral .................. | H04L 63/0254 |
| 11,509,671 | B2 * | 11/2022 | Servajean ........... | G06N 3/0455 |
| 11,640,536 | B2 * | 5/2023 | Kain .................... | G06N 3/0455 |
| | | | | 706/20 |

(Continued)

OTHER PUBLICATIONS

Wolfrath et al., Efficient Transmission and Reconstruction of Dependent Data Streams via Edge Sampling, Aug. 12, 2022.

(Continued)

*Primary Examiner* — Alicia Baturay
(74) *Attorney, Agent, or Firm* — L. Jeffrey Kelly

(57) ABSTRACT
An embodiment trains, using a first plurality of real data packets transmitted over a communications network, a generative adversarial network (GAN) to generate a first plurality of generated data packets corresponding to the plurality of real data packets. An embodiment generates, using the trained GAN, a second plurality of generated data packets from a second plurality of real data packets transmitted over the communications network. An embodiment generates, using a probability distribution of the second plurality of real data packets and a probability distribution of the second plurality of generated data packets, a plurality of sampling indices, each sampling index in the plurality of sampling indices comprising a packet number to be sampled for inspection. An embodiment inspects, using a packet inspector, a third plurality of data packets transmitted over the communications network, each inspected data packet having an index in the plurality of sampling indices.

20 Claims, 7 Drawing Sheets

(56) References Cited

U.S. PATENT DOCUMENTS

| | | | | |
|---|---|---|---|---|
| 11,783,227 | B2 * | 10/2023 | Li | ............................ G06N 3/08 |
| | | | | 706/12 |
| 2022/0053010 | A1 * | 2/2022 | Elyashiv | ................ G06N 3/088 |
| 2022/0086174 | A1 * | 3/2022 | Helmsen | ............. H04L 63/1416 |
| 2025/0317739 | A1 * | 10/2025 | Amini | ................. H04W 12/121 |

OTHER PUBLICATIONS

Bachl et al., SparseIDS: Learning Packet Sampling with Reinforcement Learning, May 4, 2020.

Meng et al., Packet Representation Learning for Traffic Classification, Aug. 14, 2022.

Mushtaq et al., Inspecting network traffic between Amazon VPCs with AWS Cloud WAN, Apr. 10, 2023.

* cited by examiner

Figure 3:
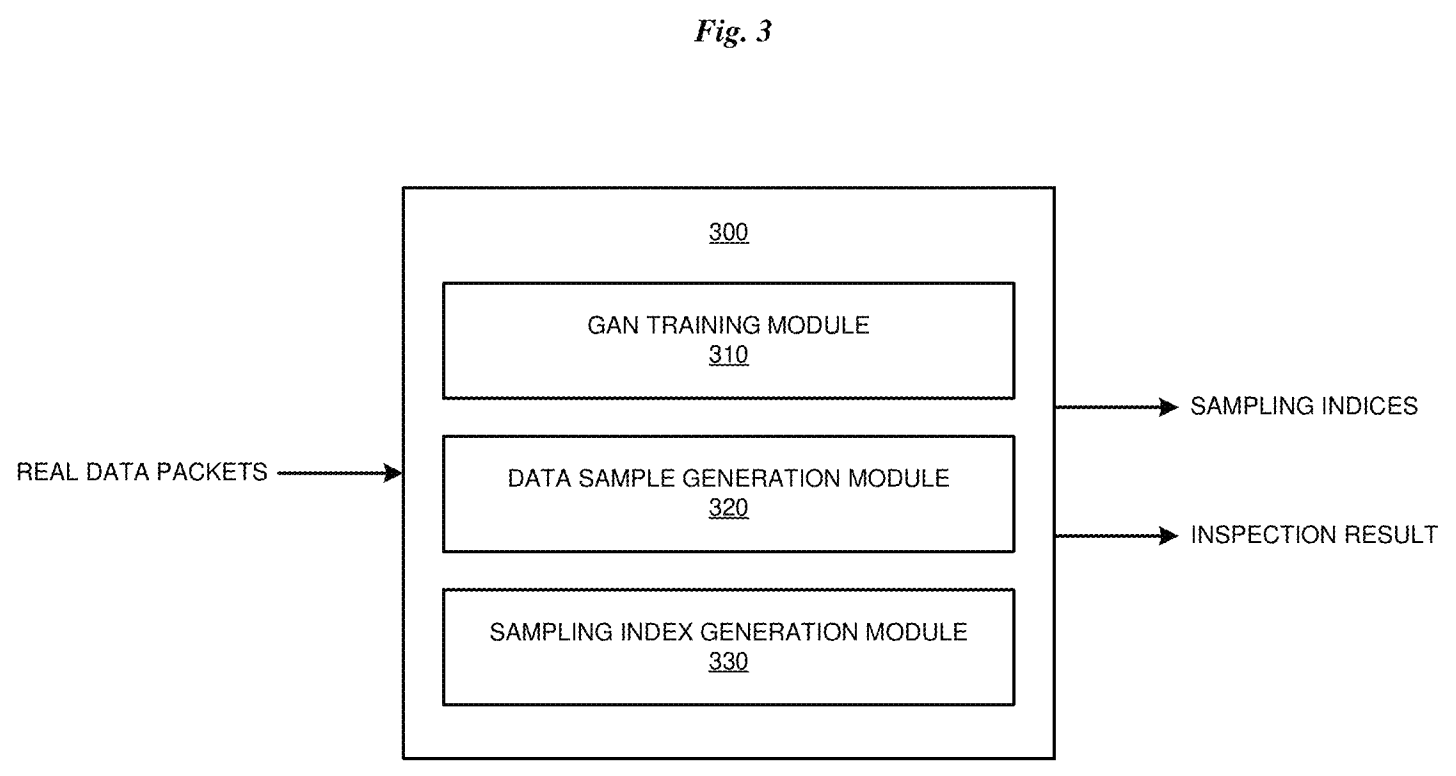

GAN TRAINING MODULE
310

DATA SAMPLE GENERATION MODULE
320

SAMPLING INDEX GENERATION MODULE
330

REAL DATA PACKETS

SAMPLING INDICES

INSPECTION RESULT

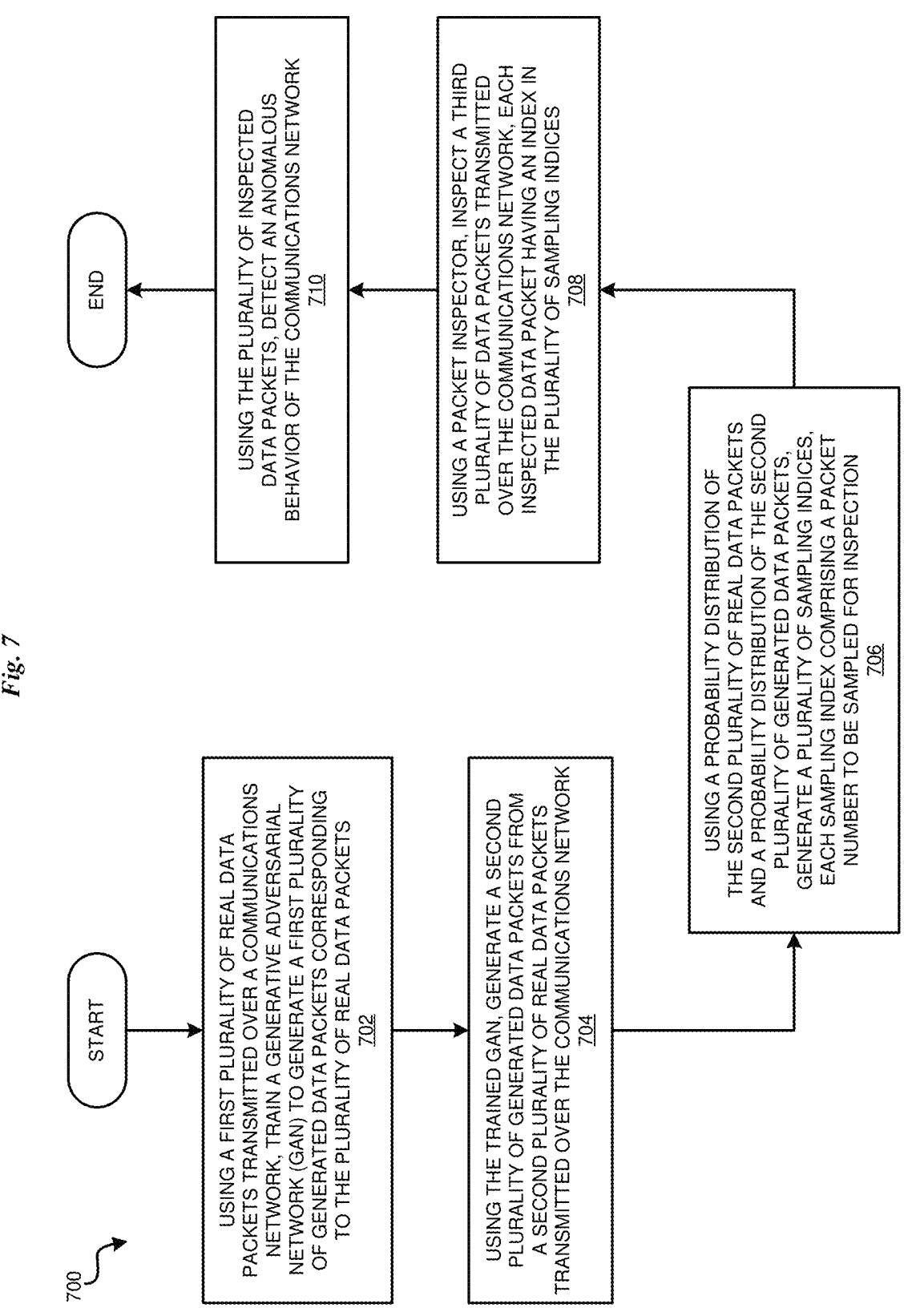

START

USING A FIRST PLURALITY OF REAL DATA PACKETS TRANSMITTED OVER A COMMUNICATIONS NETWORK, TRAIN A GENERATIVE ADVERSARIAL NETWORK (GAN) TO GENERATE A FIRST PLURALITY OF GENERATED DATA PACKETS CORRESPONDING TO THE PLURALITY OF REAL DATA PACKETS
702

USING THE TRAINED GAN, GENERATE A SECOND PLURALITY OF GENERATED DATA PACKETS FROM A SECOND PLURALITY OF REAL DATA PACKETS TRANSMITTED OVER THE COMMUNICATIONS NETWORK
704

USING A PROBABILITY DISTRIBUTION OF THE SECOND PLURALITY OF REAL DATA PACKETS AND A PROBABILITY DISTRIBUTION OF THE SECOND PLURALITY OF GENERATED DATA PACKETS, GENERATE A PLURALITY OF SAMPLING INDICES, EACH SAMPLING INDEX COMPRISING A PACKET NUMBER TO BE SAMPLED FOR INSPECTION
706

USING A PACKET INSPECTOR, INSPECT A THIRD PLURALITY OF DATA PACKETS TRANSMITTED OVER THE COMMUNICATIONS NETWORK, EACH INSPECTED DATA PACKET HAVING AN INDEX IN THE PLURALITY OF SAMPLING INDICES
708

USING THE PLURALITY OF INSPECTED DATA PACKETS, DETECT AN ANOMALOUS BEHAVIOR OF THE COMMUNICATIONS NETWORK
710

END

700

GAN-DRIVEN NETWORK TRAFFIC SAMPLING STRATEGY

BACKGROUND

The present invention relates generally to communications network management. More particularly, the present invention relates to a method, system, and computer program for a GAN-driven network traffic sampling strategy.

A generative adversarial network (GAN) is a machine learning framework that includes two artificial neural networks: a generator and a discriminator. The generator generates new, fake, instances of data and the discriminator distinguishes the generated instances from real (i.e., non-fake) data. Given a training set of real data, a GAN learns, during training, to generate new data with the same statistics as the training set. For example, a GAN trained using a training set of real images knows how to generate new images that are similar (as measured by one or more statistical measurements) to the images in the training set.

As communications networks include more devices and have more complex topologies, network uptime and performance requirements have also become more stringent. Thus, monitoring the health of devices on the network and data flows within the network, to mitigate small problems and prevent them from developing into larger problems, is increasingly important. One network management method relies on using a reverse proxy, or reverse proxy inspector, to inspect data packets sent over the network. A reverse proxy is an application that sits in front of back-end applications and forwards client requests to those applications, and application responses back to the client as if they originated from the web server itself. For example, a client makes a request to an application. A reverse proxy server intercepts and inspects the request, determines that the is valid and that the proxy does not have the requested resource in its own cache. The proxy then forwards the request to another server, which delivers the requested resource back to the proxy, which in turn delivers the requested resource to the client. A reverse proxy is also usable to forward network traffic from one device on a network to another, and thus, a reverse proxy is also in position to monitor and inspect traffic moving within a network and between logical network zones.

SUMMARY

The illustrative embodiments provide for a GAN-driven network traffic sampling strategy. An embodiment includes training, using a first plurality of real data packets transmitted over a communications network, a generative adversarial network (GAN) to generate a first plurality of generated data packets corresponding to the plurality of real data packets, the training resulting in a trained GAN. An embodiment includes generating, using the trained GAN, a second plurality of generated data packets from a second plurality of real data packets transmitted over the communications network. An embodiment includes generating, using a probability distribution of the second plurality of real data packets and a probability distribution of the second plurality of generated data packets, a plurality of sampling indices, each sampling index in the plurality of sampling indices comprising a packet number to be sampled for inspection. An embodiment includes inspecting, using a packet inspector, a third plurality of data packets transmitted over the communications network, each inspected data packet having an index in the plurality of sampling indices. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example configuration for a GAN-driven network traffic sampling strategy in accordance with an illustrative embodiment;

FIG. 4 depicts an example of a GAN-driven network traffic sampling strategy in accordance with an illustrative embodiment;

FIG. 5 depicts a continued example of a GAN-driven network traffic sampling strategy in accordance with an illustrative embodiment;

FIG. 7 depicts a flowchart of an example process for a GAN-driven network traffic sampling strategy in accordance with an illustrative embodiment.

DETAILED DESCRIPTION

Figure 1:
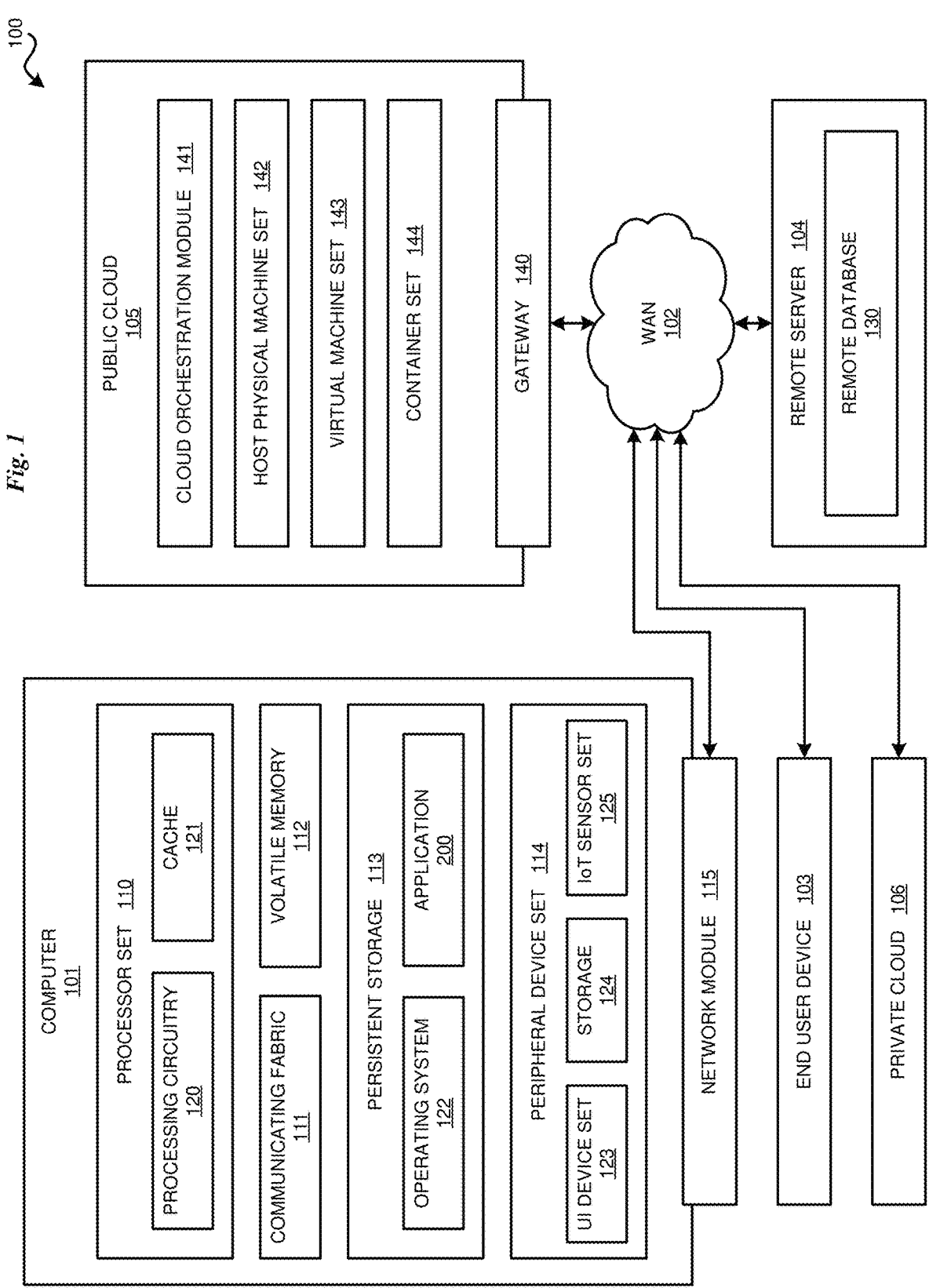
FIG. 1 depicts a block diagram of a computing environment in accordance with an illustrative embodiment.

The illustrative embodiments recognize that, when selecting samples of network traffic to detect and avert network problems, selecting an appropriate sampling rate is critical. Because sampling takes time, delaying network traffic, oversampling reduces network performance below an acceptable level. On the other hand, undersampling risks missing important data, and thus reduces monitoring quality below an acceptable level. Thus, the illustrative embodiments recognize that it is important to select a sampling rate that provides the required level of monitoring quality, but avoid a higher sampling rate than that required. Typically, the sampling rate is a constant, or adjusted in an ad hoc manner by human experts, but a constant is likely to result in oversampling for safety reasons, thus reducing network performance. In addition, the sampling rate might need to change over time, as a network's configuration and type and amount of traffic change, and human experts are unlikely to be able to anticipate such changes. Thus, the illustrative embodiments recognize that there is an unmet need to select network data samples in a manner that is adapted to a particular network being monitored, while selecting a sampling rate that is only as high as actually needed for a particular situation.

The present disclosure addresses the deficiencies described above by providing a process (as well as a system, method, machine-readable medium, etc.) that, using a first plurality of real data packets transmitted over a communications network, trains a GAN to generate a first plurality of generated data packets corresponding to the plurality of real data packets; generates, using the trained GAN, a second plurality of generated data packets from a second plurality of real data packets transmitted over the communications network; generates, using a probability distribution of the second plurality of real data packets and a probability distribution of the second plurality of generated data packets, a plurality of sampling indices; and inspects, using a packet inspector, a third plurality of data packets transmitted over the communications network, each inspected data packet having an index in the plurality of sampling indices. Thus, the illustrative embodiments provide for a GAN-driven network traffic sampling strategy.

An illustrative embodiment receives a plurality of real data packets transmitted over a communications network. One embodiment uses a portion of the plurality of real data packets as model training data. Another embodiment uses a separate plurality of real data packets (e.g., data packets transmitted over a different network, at a different time, or indicative of a particular network scenario desired to be included in the training) as model training data.

An embodiment trains a GAN to generate a first plurality of generated data packets corresponding to the real data packets. In particular, an embodiment uses a presently available technique to add noise to samples of real data packets, thus generating noisy simulated network traffic for use as training data. Learning to generate noisy traffic is a technique used to improve anomaly detection systems' ability to identify abnormal behavior within a network or system. Intentionally introducing noise or anomalies during the training process helps the model become more robust and adaptive, making the model better equipped to detect anomalous patterns that may indicate malicious or unexpected activity during real-world operations. In particular, an anomaly detection model is initially trained on a dataset of normal network traffic, representing typical patterns of communication, transactions, or user behavior within a network. The model learns the regularities and common features present in the normal data, establishing a baseline for what is considered "normal" behavior. As well, to make the model more resilient and capable of recognizing deviations from normalcy, noise is intentionally introduced into the training data. This noise can take various forms, such as random variations, simulated attacks, or anomalies injected into the training set. During training, the model is exposed to both clean and noisy data. Thus, the model learns not only to recognize the known patterns of normal behavior but also to identify anomalies, irregularities, or deviations from the expected patterns, including those introduced by noise. Once trained, the model can be deployed to monitor network traffic in real-time. When the system encounters traffic that deviates significantly from the learned normal patterns, the model can flag it as potentially anomalous or suspicious. The model's ability to generalize from noisy data allows it to detect not only known anomalies but also novel and evolving threats that may not have been explicitly seen during training. Exposing the model to a variety of noisy scenarios during training also helps the model becomes less prone to generating false positives.

A generator portion of the GAN uses the noisy simulated network traffic to generate generated data packet samples. A discriminator portion of the GAN discriminates between the real data packets and the generated data packet samples, deciding (i.e., predicting) whether a particular input is real or generated (i.e., fake). Thus, the discriminator portion outputs two distributions: a real distribution and a fake distribution. The real distribution is a distribution of the discriminator's prediction of a probability that an input sample was sampled from real data. The fake distribution is a distribution of the discriminator's prediction of a probability that an input sample was sampled from fake data.

An embodiment computes an infinium regularization of error by computing a Wasserstein distance, resulting in a regularization. A Wasserstein distance is a presently available technique that measures the minimum cost required to transform a real distribution (denoted by Pr) into a fake distribution (denoted by Pg), where the cost is defined as the distance between a sample from Pr (denoted by x) and a sample from Pg (denoted by y), using the expression $W(Pr, Pg) = \inf\{E(x, y) \sim \gamma[\|x-y\|]\}$, where $\|x-y\|$ is the distance (e.g., Euclidean distance) between points x and y, y denotes joint distributions (a probability distribution over pairs of random variables (X,Y) where X follows the distribution Pr and Y follows the distribution Pg), and $\inf\{\ \}$ denotes the infimum of a set, i.e., a value that is less than or equal to all the elements in the set but as small as possible. In other words, the infimum of a set is the greatest lower bound of the set. The infimum is taken over all joint distributions $\gamma$ with Pr and Pg as their marginal functions, and W(Pr, Pg) represents the set of all such joint distributions. Marginal functions describe how the probability mass is distributed over the entire range of possible data values for both real data and generated data. This regularization improves the stability of the training process and the quality of the generated samples, and is used to minimize the adjusted loss function.

An embodiment, using a presently available GAN training technique, uses the computed regularization to compute a generator loss, and uses the generator loss to adjust one or more parameters of the generator, thus training the generator. An embodiment, using a presently available GAN training technique, uses the computed regularization and a penalty term to compute a gradient loss, and uses the gradient loss to adjust one or more parameters of the discriminator, thus training the discriminator.

An embodiment receives a second plurality of real data packets transmitted over the communications network and uses the trained GAN to generate a second plurality of generated data packets from the real data packets. Both the second plurality of real data packets and the second plurality of generated data packets have corresponding probability distributions.

An embodiment generates, using a probability distribution of the second plurality of real data packets and a probability distribution of the second plurality of generated data packets, a plurality of sampling indices. In particular, an embodiment uses a presently available pseudo-random number generator technique to generate a plurality of random numbers Z, with a uniform distribution. An embodiment computes an interpolation between a probability distribution of the real data and a probability distribution of the generated data, by converting each probability distribution to a corresponding cumulative distribution function, converting each cumulative distribution function to a discrete form (e.g., by rounding each value down, up, or to the nearest integer) denoted by $P_{real}$ and $P_{noisy}$ respectively, and computing sampling-index$=Z*P_{real}+ (1-Z)*P_{noisy}$ for each random number Z.

An embodiment uses a presently available packet inspection technique, such as a reverse proxy, to inspect data packets transmitted over the communications network. Each inspected data packet has an index in the plurality of sampling indices. For example, if the plurality of sampling indices includes indices 1, 4, 10, 25, 42, etc., an embodiment samples the first, fourth, tenth, twenty-fifth, and forty-second packets, and so on.

An embodiment uses the plurality of inspected data packets and a presently available technique to detect an anomalous behavior of the communications network. For example, network traffic data might be sampled to detect and avert network problems such as a distributed attack that is disguised as 'good' network traffic, or unusual traffic spikes that are associated with a particular group of devices or a geography, and include unusual network hops. As another example, an embodiment might be used to understand the commissioning of new network campuses that should be behaving synonymously to alternative campuses that have been commissioned earlier, as new commissions are more vulnerable to attacks and spurious activities.

An embodiment retrains the GAN with new real data, to adapt the GAN to changing network traffic characteristics. Another embodiment uses a presently available technique to analyze the GAN's output and provides feedback when sampling network traffic according to the selected sampling indices fails to detect an anomalous behavior of the communications network. An embodiment uses the feedback to adjust the GAN or to adjust one or more anomalous behavior detection criteria, using presently available techniques.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as a module 200 implementing a GAN-driven network traffic sampling strategy. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer

101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
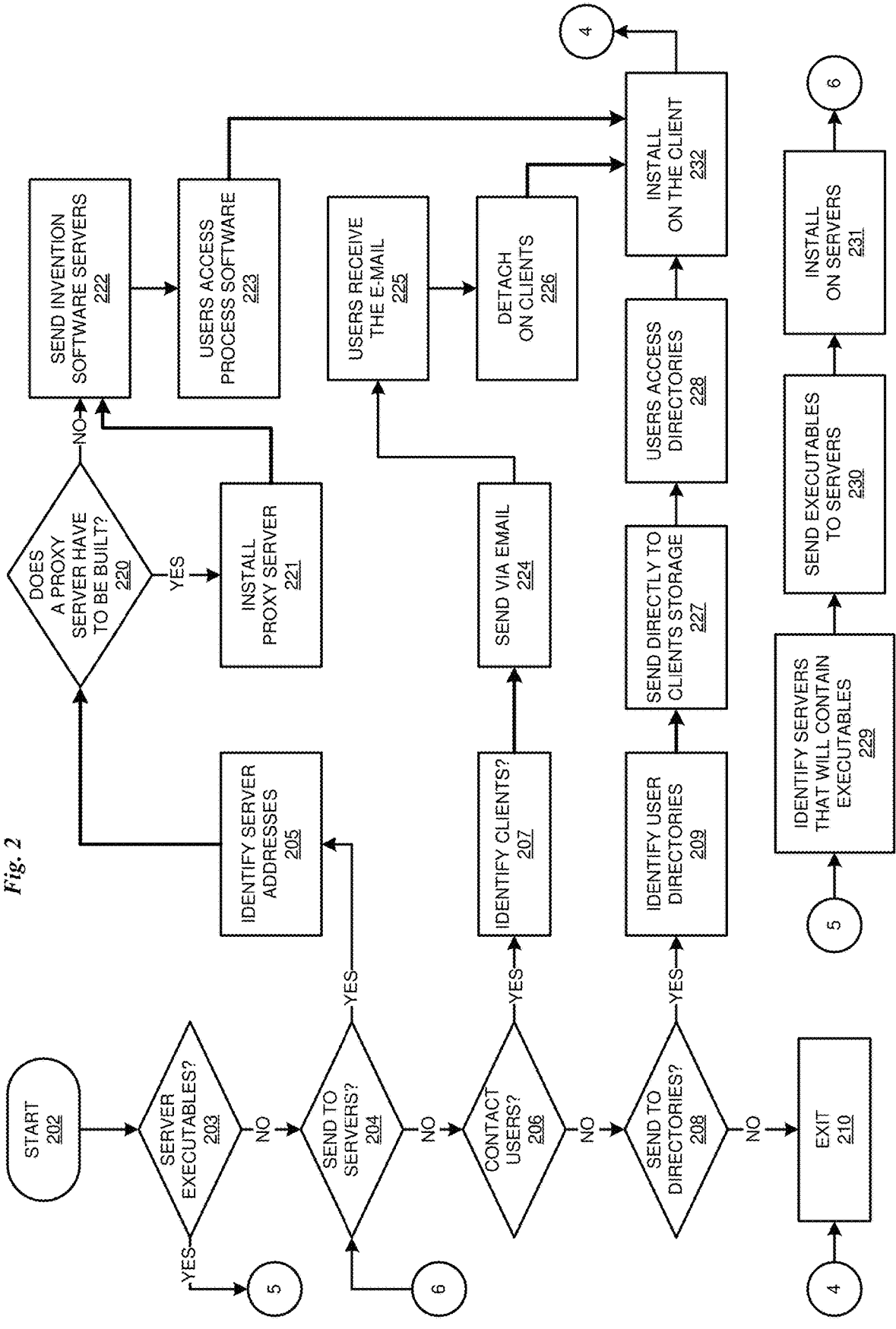
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing a GAN-driven network traffic sampling strategy may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

With reference to FIG. 3, this figure depicts a block diagram of an example configuration for a GAN-driven network traffic sampling strategy in accordance with an illustrative embodiment. Application 300 is the same as application 200 in FIG. 1.

In the illustrated embodiment, application 300 receives a plurality of real data packets transmitted over a communications network. One implementation of application 300 uses a portion of the plurality of real data packets as model training data. Another implementation of application 300 uses a separate plurality of real data packets (e.g., data packets transmitted over a different network, at a different time, or indicative of a particular network scenario desired to be included in the training) as model training data.

GAN training module 310 trains a GAN to generate a first plurality of generated data packets corresponding to the real data packets. In particular, module 310 uses a presently available technique to add noise to samples of real data packets, thus generating noisy simulated network traffic for use as training data. A generator portion of the GAN uses the noisy simulated network traffic to generate generated data packet samples. A discriminator portion of the GAN discriminates between the real data packets and the generated data packet samples, deciding (i.e., predicting) whether a particular input is real or generated (i.e., fake). Thus, the discriminator portion outputs two distributions: a real distribution and a fake distribution. The real distribution is a distribution of the discriminator's prediction of a probability that an input sample was sampled from real data. The fake distribution is a distribution of the discriminator's prediction of a probability that an input sample was sampled from fake data.

Module 310 computes an infinium regularization of error by computing a Wasserstein distance, resulting in a regularization. A Wasserstein distance is a presently available technique that measures the minimum cost required to transform a real distribution (denoted by Pr) into a fake distribution (denoted by Pg), where the cost is defined as the distance between a sample from Pr (denoted by x) and a sample from Pg (denoted by y), using the expression W(Pr, Pg)=inf{E(x,y)−γ[||x−y||]}, where ||x−y|| is the distance (e.g., Euclidean distance) between points x and y, y denotes joint distributions (a probability distribution over pairs of random variables (X,Y) where X follows the distribution Pr and Y follows the distribution Pg), and inf{ } denotes the infimum of a set, i.e., a value that is less than or equal to all the elements in the set but as small as possible. In other words, the infimum of a set is the greatest lower bound of the set. The infimum is taken over all joint distributions γ with Pr and Pg as their marginal functions, and W(Pr, Pg) represents the set of all such joint distributions. Marginal functions describe how the probability mass is distributed over the entire range of possible data values for both real data and generated data. This regularization improves the stability of the training process and the quality of the generated samples, and is used to minimize the adjusted loss function.

Module 310, using a presently available GAN training technique, uses the computed regularization to compute a generator loss, and uses the generator loss to adjust one or more parameters of the generator, thus training the generator. Module 310, using a presently available GAN training technique, uses the computed regularization and a penalty term to compute a gradient loss, and uses the gradient loss to adjust one or more parameters of the discriminator, thus training the discriminator.

Data sample generation module 320 receives a second plurality of real data packets transmitted over the communications network and uses the trained GAN to generate a second plurality of generated data packets from the real data packets. Both the second plurality of real data packets and the second plurality of generated data packets have corresponding probability distributions.

Sampling index generation module 330 generates, using a probability distribution of the second plurality of real data packets and a probability distribution of the second plurality of generated data packets, a plurality of sampling indices. In particular, module 330 uses a presently available pseudo-random number generator technique to generate a plurality of random numbers Z, with a uniform distribution. Module 330 computes an interpolation between a probability distribution of the real data and a probability distribution of the generated data, by converting each probability distribution to a corresponding cumulative distribution function, converting each cumulative distribution function to a discrete form (e.g., by rounding each value down, up, or to the nearest integer) denoted by $P_{real}$ and $P_{noisy}$ respectively, and computing sampling-index=Z*$P_{real}$+(1−Z)*$P_{noisy}$ for each random number Z.

Application 300 uses a presently available packet inspection technique, such as a reverse proxy, to inspect data packets transmitted over the communications network, or cause the data packets to be inspected by another application. Each inspected data packet has an index in the plurality of sampling indices. For example, if the plurality of sampling indices includes indices 1, 4, 10, 25, 42, etc., application 300 samples, or causes to be sampled, the first, fourth, tenth, twenty-fifth, and forty-second packets, and so on. Application 300 reports a result of the inspection.

Application 300 uses the plurality of inspected data packets and a presently available technique to detect an anomalous behavior of the communications network. For example, network traffic data might be sampled to detect and avert network problems such as a distributed attack that is disguised as 'good' network traffic, or unusual traffic spikes that are associated with a particular group of devices or a geography, and include unusual network hops. As another example, application 300 might be used to understand the commissioning of new network campuses that should be behaving synonymously to alternative campuses that have been commissioned earlier, as new commissions are more vulnerable to attacks and spurious activities.

Application 300 retrains the GAN with new real data, to adapt the GAN to changing network traffic characteristics. Another implementation of application 300 uses a presently available technique to analyze the GAN's output and provides feedback when sampling network traffic according to the selected sampling indices fails to detect an anomalous behavior of the communications network. Application 300 uses the feedback to adjust the GAN or to adjust one or more anomalous behavior detection criteria, using presently available techniques.

Figure 4:
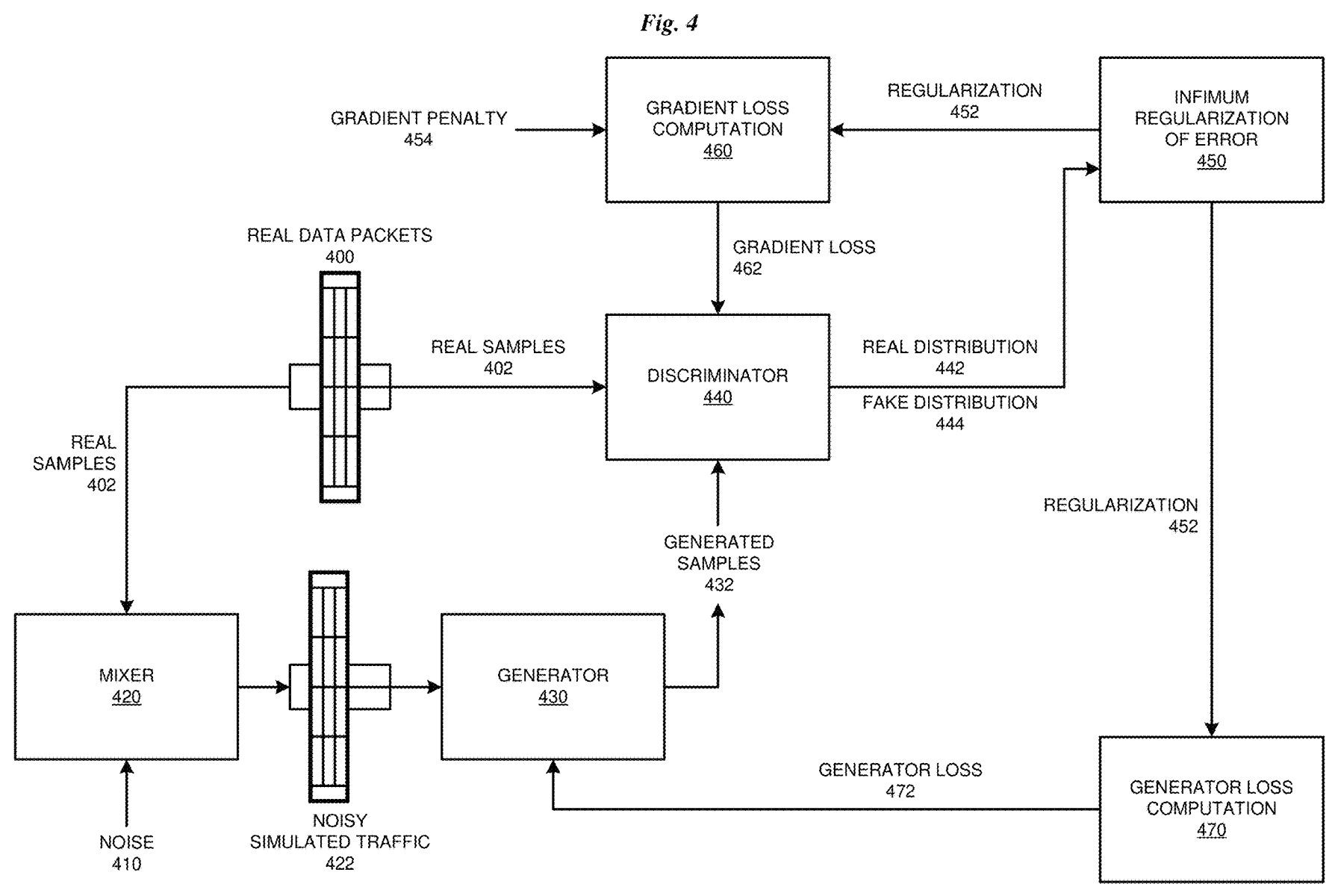

With reference to FIG. 4, this figure depicts an example of a GAN-driven network traffic sampling strategy in accordance with an illustrative embodiment. The example can be executed using application 300 in FIG. 3.

As depicted, application 300 receives real data packets 400, a plurality of real data packets transmitted over a communications network, and samples real data packets 400, resulting in real samples 402. Mixer 420 adds noise 410 to real samples 402, thus generating noisy simulated network traffic 422 for use as training data. Generator 430 uses noisy simulated network traffic 422 to generate generated data packet samples 432. Discriminator 440 discriminates between real samples 402 and generated data packet samples 432, deciding (i.e., predicting) whether a particular input is real or generated (i.e., fake). Thus, discriminator 440 outputs two distributions: real distribution 442 and fake distribution 444.

Infinium regularization of error 450 computes a Wasserstein distance in a manner described herein, resulting in regularization 452. This regularization improves the stability of the training process and the quality of the generated samples, and is used to minimize the adjusted loss function.

Generator loss computation 470 uses regularization 452 to compute generator loss 472, which is used to adjust one or more parameters of generator 420, thus training generator 430. Gradient loss computation 460 uses regularization 452 and gradient penalty 454 to compute gradient loss 462, which is used to adjust one or more parameters of discriminator 440, thus training discriminator 440.

Figure 5:
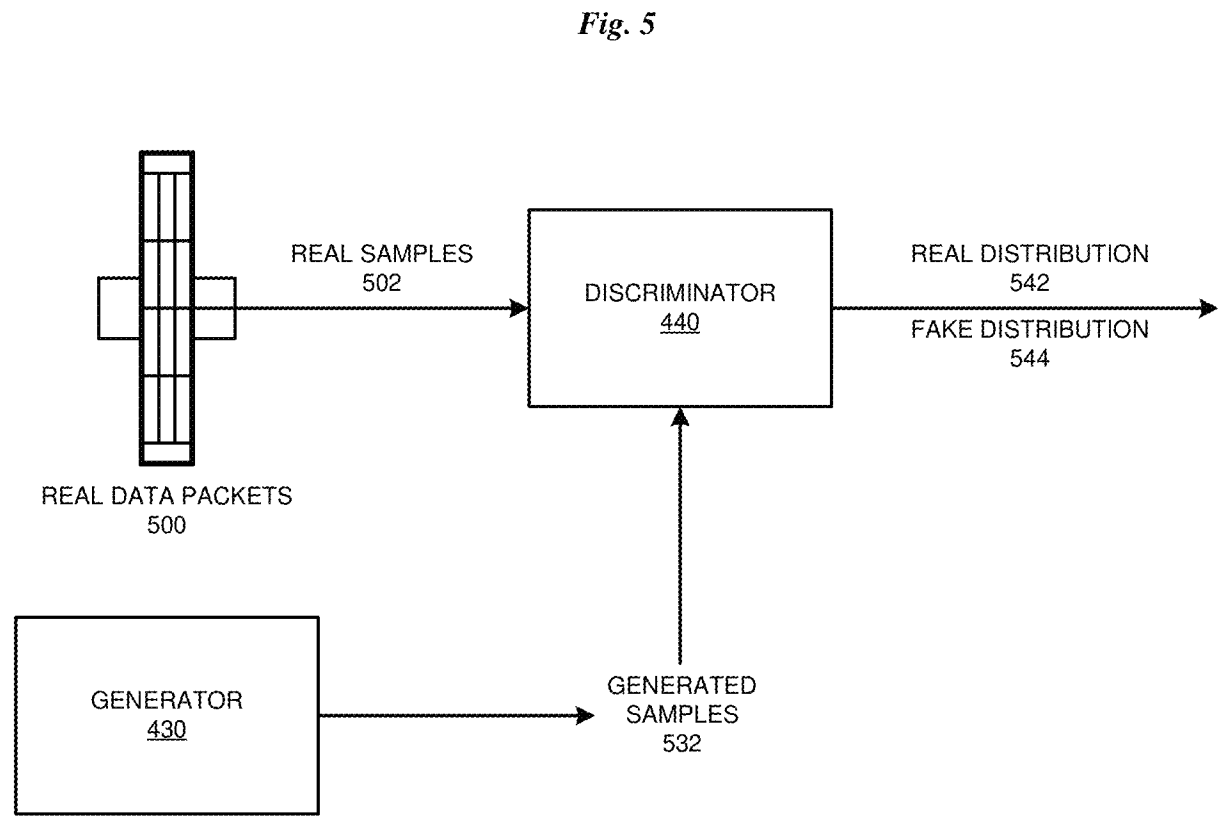

With reference to FIG. 5, this figure depicts a continued example of a GAN-driven network traffic sampling strategy in accordance with an illustrative embodiment. Generator 430 and discriminator 440 are the same as generator 430 and discriminator 440 in FIG. 4.

As depicted, application 300 receives real data packets 500, a plurality of real data packets transmitted over a communications network, and samples real data packets 500, resulting in real samples 502. Generator 430 generates generated samples 532. Discriminator 440 discriminates between real samples 502 and generated samples 532, deciding (i.e., predicting) whether a particular input is real or generated (i.e., fake). Thus, discriminator 440 outputs two distributions: real distribution 542 and fake distribution 544.

Figure 6:
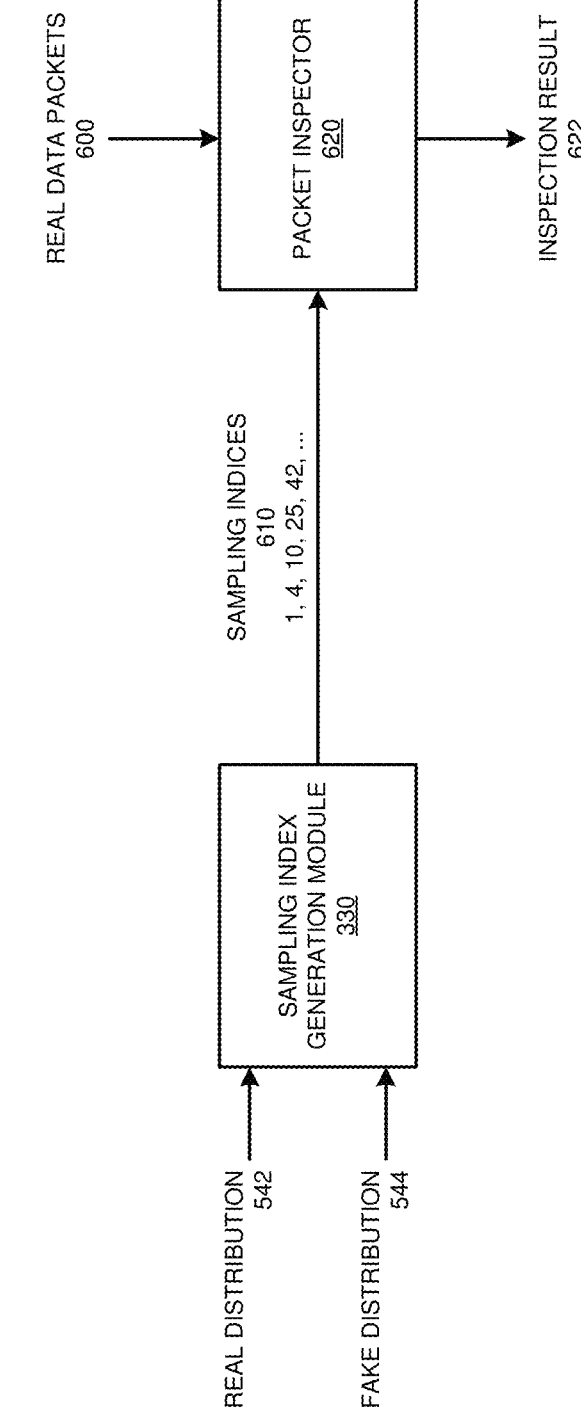
FIG. 6 depicts a continued example of a GAN-driven network traffic sampling strategy in accordance with an illustrative embodiment.

With reference to FIG. 6, this figure depicts a continued example of a GAN-driven network traffic sampling strategy in accordance with an illustrative embodiment. Sampling index generation module 330 is the same as sampling index generation module 330 in FIG. 3. Real distribution 542 and fake distribution 544 are the same as real distribution 542 and fake distribution 544 in FIG. 5.

Sampling index generation module 330 uses real distribution 542 and fake distribution 544 to generate sampling indices 610. Packet inspector 620 inspects real data packets 600, generating inspection result 622.

With reference to FIG. 7, this figure depicts a flowchart of an example process for a GAN-driven network traffic sampling strategy in accordance with an illustrative embodiment. Process 700 can be implemented in application 200 in FIG. 3.

In the illustrated embodiment, at block 702, the process, using a first plurality of real data packets transmitted over a communications network, trains a GAN to generate a first plurality of generated data packets corresponding to the plurality of real data packets. At block 704, the process, using the trained GAN, generates a second plurality of generated data packets from a second plurality of real data packets transmitted over the communications network. At block 706, the process, using a probability distribution of the second plurality of real data packets and a probability distribution of the second plurality of generated packets, generates a plurality of sampling indices, each sampling index comprising a packet number to be sampled for inspection. At block 708, the process, using a packet inspector, inspects a third plurality of data packets transmitted over the communications network, each inspected data packet having an index in the plurality of sampling indices. At block 710, the process, using the plurality of inspected data packets, detects an anomalous behavior of the communications network. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

training, using a first plurality of real data packets transmitted over a communications network, a generative adversarial network (GAN) to generate a first plurality of generated data packets corresponding to the first plurality of real data packets, the training resulting in a trained GAN;

generating, using the trained GAN, a second plurality of generated data packets from a second plurality of real data packets transmitted over the communications network;

generating, using a probability distribution of the second plurality of real data packets and a probability distribution of the second plurality of generated data packets, a plurality of sampling indices, each sampling index in the plurality of sampling indices comprising a packet number to be sampled for inspection; and inspecting, using a packet inspector, a third plurality of data packets transmitted over the communications network, each inspected data packet having an index in the plurality of sampling indices.

2. The computer-implemented method of claim 1, further comprising:

detecting, using the third plurality of data packets, an anomalous behavior of the communications network.

3. The computer-implemented method of claim 2, further comprising:

determining that inspecting the third plurality of data packets has failed to detect the anomalous behavior; and retraining, responsive to the determining, using a fourth plurality of real data packets, the GAN to generate a fourth plurality of generated data packets corresponding to the fourth plurality of real data packets.

4. The computer-implemented method of claim 1, wherein the training is performed using noisy simulated network traffic.

5. The computer-implemented method of claim 4, wherein the noisy simulated network traffic is generated by adding noise to the first plurality of real data packets.

6. The computer-implemented method of claim 1, wherein generating the plurality of sampling indices comprises computing an interpolation between the probability distribution of the second plurality of real data packets and the probability distribution of the second plurality of generated data packets.

7. A computer program product comprising one or more computer readable storage media, and program instructions collectively stored on the one or more computer readable storage media, the program instructions executable by a processor to cause the processor to perform operations comprising:

training, using a first plurality of real data packets transmitted over a communications network, a generative adversarial network (GAN) to generate a first plurality of generated data packets corresponding to the first plurality of real data packets, the training resulting in a trained GAN;

generating, using the trained GAN, a second plurality of generated data packets from a second plurality of real data packets transmitted over the communications network;

generating, using a probability distribution of the second plurality of real data packets and a probability distribution of the second plurality of generated data packets, a plurality of sampling indices, each sampling index in the plurality of sampling indices comprising a packet number to be sampled for inspection; and inspecting, using a packet inspector, a third plurality of data packets transmitted over the communications network, each inspected data packet having an index in the plurality of sampling indices.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, further comprising:

detecting, using the third plurality of data packets, an anomalous behavior of the communications network.

11. The computer program product of claim 10, further comprising:

determining that inspecting the third plurality of data packets has failed to detect the anomalous behavior; and retraining, responsive to the determining, using a fourth plurality of real data packets, the GAN to generate a fourth plurality of generated data packets corresponding to the fourth plurality of real data packets.

12. The computer program product of claim 7, wherein the training is performed using noisy simulated network traffic.

13. The computer program product of claim 12, wherein the noisy simulated network traffic is generated by adding noise to the first plurality of real data packets.

14. The computer program product of claim 7, wherein generating the plurality of sampling indices comprises computing an interpolation between the probability distribution of the second plurality of real data packets and the probability distribution of the second plurality of generated data packets.

15. A computer system comprising a processor and one or more computer readable storage media, and program instructions collectively stored on the one or more computer readable storage media, the program instructions executable by the processor to cause the processor to perform operations comprising:

training, using a first plurality of real data packets transmitted over a communications network, a generative adversarial network (GAN) to generate a first plurality of generated data packets corresponding to the first plurality of real data packets, the training resulting in a trained GAN;

generating, using the trained GAN, a second plurality of generated data packets from a second plurality of real data packets transmitted over the communications network;

generating, using a probability distribution of the second plurality of real data packets and a probability distribution of the second plurality of generated data packets, a plurality of sampling indices, each sampling index in the plurality of sampling indices comprising a packet number to be sampled for inspection; and inspecting, using a packet inspector, a third plurality of data packets transmitted over the communications network, each inspected data packet having an index in the plurality of sampling indices.

16. The computer system of claim 15, further comprising:

detecting, using the third plurality of data packets, an anomalous behavior of the communications network.

17. The computer system of claim 16, further comprising:

determining that inspecting the third plurality of data packets has failed to detect the anomalous behavior; and retraining, responsive to the determining, using a fourth plurality of real data packets, the GAN to generate a fourth plurality of generated data packets corresponding to the fourth plurality of real data packets.

18. The computer system of claim 15, wherein the training is performed using noisy simulated network traffic.

19. The computer system of claim 18, wherein the noisy simulated network traffic is generated by adding noise to the first plurality of real data packets.

20. The computer system of claim 15, wherein generating the plurality of sampling indices comprises computing an interpolation between the probability distribution of the second plurality of real data packets and the probability distribution of the second plurality of generated data packets.

*   *   *   *   *